(12) United States Patent
Grover et al.

(10) Patent No.: US 7,699,907 B2
(45) Date of Patent: Apr. 20, 2010

(54) APPARATUS AND METHODS FOR GAS SEPARATION

(75) Inventors: Bhadra S. Grover, Sugar Land, TX (US); Paul Wentink, Feucherolles (FR)

(73) Assignees: Air Liquide Process & Construction, Inc., Houston, TX (US); L'Air Liquid, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 838 days.

(21) Appl. No.: 11/463,065

(22) Filed: Aug. 8, 2006

(65) Prior Publication Data

US 2007/0051042 A1 Mar. 8, 2007

Related U.S. Application Data

(60) Provisional application No. 60/708,927, filed on Aug. 17, 2005.

(51) Int. Cl.
B01D 53/02 (2006.01)

(52) U.S. Cl. .............................. 95/96; 96/143; 96/148; 96/130

(58) Field of Classification Search ..................... 95/95, 95/96, 103, 143, 148; 96/130
See application file for complete search history.

(56) References Cited

U.S. PATENT DOCUMENTS

| | | | |
|---|---|---|---|
| 3,788,037 A | 1/1974 | Shell et al. | |
| 4,077,779 A | 3/1978 | Sircar et al. | |
| 4,171,206 A | 10/1979 | Sircar | |
| 4,299,596 A | 11/1981 | Benkmann | |
| 4,711,645 A | 12/1987 | Kumar | |
| 4,846,851 A | * 7/1989 | Guro et al. | ..................... 95/100 |
| 5,026,406 A | 6/1991 | Kumar | |
| 5,133,785 A | 7/1992 | Kumar et al. | |
| 5,154,736 A | 10/1992 | Mifflin | |
| 5,234,472 A | 8/1993 | Krishnamurthy et al. | |
| 5,294,247 A | 3/1994 | Scharpf et al. | |
| 5,354,346 A | 10/1994 | Kumar | |
| 5,538,706 A | 7/1996 | Kapoor et al. | |
| 5,656,065 A | 8/1997 | Kalbassi et al. | |
| 5,714,132 A | 2/1998 | Kapoor et al. | |
| 6,007,606 A | 12/1999 | Baksh et al. | |
| 6,942,719 B2 | 9/2005 | Stewart | |
| 7,037,485 B1 | 5/2006 | Drnevich et al. | |

(Continued)

FOREIGN PATENT DOCUMENTS

DE 2911669 A1 10/1980

*Primary Examiner*—Robert A Hopkins
(74) *Attorney, Agent, or Firm*—Elwood L. Haynes

(57) ABSTRACT

Methods and systems for producing hydrogen are provided. In one embodiment, a method of producing hydrogen comprises reacting a feed source with steam to produce a gas mixture containing hydrogen and a residue gas; introducing the gas mixture into a purification unit; adsorbing the residue gas; and discharging at least a portion of the hydrogen. The method further comprises depressurizing the purification unit; discharging at least a portion of the residue gas during the depressurization; recycling the residue gas to the feed source; and discharging the residue gas remaining in the purification unit. In another embodiment, the method includes discharging a portion of the residue gas during the depressurization such that the residue gas discharged has a higher hydrocarbon content than the secondary product remaining in the purification unit.

26 Claims, 7 Drawing Sheets

U.S. PATENT DOCUMENTS

2001/0009125 A1 7/2001 Monereau et al.
2003/0152497 A1 8/2003 Giacobbe et al.
2004/0179998 A1 9/2004 Gittleman et al.
2005/0031504 A1 2/2005 Armstrong et al.

* cited by examiner

APPARATUS AND METHODS FOR GAS SEPARATION

CROSS-REFERENCE TO RELATED APPLICATIONS

This application claims the benefit under 35 U.S.C. §119 (e) to U.S. Provisional Application Ser. No. 60/708,927, filed Aug. 17, 2005, the entire contents of which are incorporated herein by reference.

BACKGROUND

There is a variety of known processes for producing hydrogen. Some examples include the following: (1) steam reforming of natural gas or naphtha (2) catalytic reforming of hydrocarbons, e.g. gasoline and fuel oil, and (3) partial oxidation of coal, heavy oils, or natural gas. Of these processes, steam reforming of natural gas is probably the most widely used process for hydrogen production.

FIG. 1 shows a typical process for producing hydrogen. The process involves reacting methane 110 (e.g., from natural gas) with steam 120 in a steam methane reforming ("SMR") unit to produce primarily hydrogen and carbon monoxide (sometimes called synthesis gas). The steam reforming reaction proceeds as follow:

$$CH_4 + H_2O \Rightarrow CO + 3H_2$$

This reaction usually takes place in the reforming unit 130 at high temperature and high pressure. The reaction is equilibrium limited and is highly endothermic. The heat for the reaction is provided by a furnace 137. Fuel 140 for the furnace 137 may be supplied from the methane feedstock 115. The hot exhaust gas 145 from the furnace 137 may be used to preheat feed 138, and generate or superheat the steam 120 for the reaction.

The effluent stream from the reforming unit 130 is then sent to a shift reactor 150 to obtain additional hydrogen. In the shift reactor 150, the carbon monoxide is reacted with steam to produce more hydrogen. This reaction is usually called the "water gas shift" reaction and the chemical equation for the shift reaction proceeds as follow:

$$CO + H_2O \Rightarrow CO_2 + H_2$$

The steam reacts with the carbon monoxide from the reforming reaction to produce carbon dioxide and additional hydrogen gas. The reaction energy is exothermic and the heat generated is normally utilized for producing additional steam or heating up other process streams.

The effluent stream from the shift reactor 150 is cooled and sent to a purification unit 160 to separate the hydrogen gas. Pressure swing adsorbers ("PSA") are often used as the purification unit 160 following steam reformation and shift reaction. Generally, in a PSA process, the gas mixture stream is passed over an adsorbent bed at elevated pressure, whereby the bed selectively adsorbs and holds the impurities. In this respect, the PSA process produces a substantially pure hydrogen product at elevated pressure. The impurities adsorbed on the PSA beds are desorbed at a substantially lower pressure. These desorbed impurities along with unrecovered hydrogen form a low pressure residue gas, which may include carbon dioxide, carbon monoxide, and unreacted methane.

To improve the overall thermal efficiency of the process, it is important to utilize the heat available in the process streams such as process effluents from the reforming unit 130 and the shift reactor 150, and exhaust gas 145 from the furnace 137. In addition to generating or superheating steam, such heat may be used to heat process feed, combustion air for the furnace, and preheat boiler-feed-water. Typically, the amount of steam that may be generated from all available heat exceeds the amount of steam required for the steam reformer 130. The excess steam is normally exported as a byproduct of the hydrogen plant.

As shown in Table 1 below, the residue gas 165 process stream, which may include $CO_2$, $CO$, $CH_4$, and $H_2$, has a relatively low heating value (e.g., 2419 kcal/$Nm^3$, compared to heating value of 9,090 kcal/$Nm^3$ for natural gas) and is usually at a low pressure of about 1.3 bara. Consequently, use of the residue gas in a hydrogen plant is limited. Typically, the residue gas 165 is recycled to the reformer furnace 137 and used as fuel.

Table 1 below illustrates a typical material balance around the PSA.

TABLE 1

| Component | Unit | Feed to PSA | Pure H2 | Residue Gas |
|---|---|---|---|---|
| H2 | Nm3/h | 78449 | 69820 | 8629 |
| CH4 | Nm3/h | 6339 | | 6339 |
| CO | Nm3/h | 4470 | | 4470 |
| CO2 | Nm3/h | 17246 | | 17246 |
| N2 | Nm3/h | 383 | 70 | 313 |
| Flow | Nm3/h | 106887 | 69890 | 36997 |
| Heating Value | Kcal/Nm3, LHV | | | 2419 |
| Pressure | Bar a (psig) | 25.3 (350) | 24.3 (335) | 1.3 (5) |

One problem encountered during the hydrogen generating process is that the amount of residue gas 165 may limit the flexibility and efficiency of the overall process. One example of the limitation imposed by the residue gas 165 is when the demand of by-product steam is low and suppression of steam production is desired without loss of thermal efficiency of the process. The by-product steam is typically produced by utilizing the heat in the gas exhaust 145 leaving the furnace 137 and the process effluents of the reforming unit 130 and the shift reactor 150. During a period of low steam demand, steam production may be suppressed by redirecting the hot exhaust gas 145 to preheat the natural gas feed 110, the combustion air for the furnace 137, or the fuel stream 140 to the furnace 137. As a result of the preheating, not as much heat is needed in the furnace 137, thereby reducing the requirement of the fuel stream 140. Typically, the residue gas 165 is a major component of the fuel stream 140, while "make-up" fuel, which is input from other sources e.g., fuel supplied from methane feedstock 110, makes up the remaining portion of the fuel stream 140. Because all of the residue gas 165 is fed to the fuel stream 140, a reduction in the fuel stream 140 is generally accomplished by controlling input from the make-up fuel. Thus, the degree of steam suppression depends on the percentage of the make-up fuel stream.

The make-up fuel stream is also used as a means to control the temperature in the furnace. Proper control of furnace temperature typically requires about 10 to 15% percent of heat to be provided by the make up fuel. This percentage of the make up fuel defines the lower limit below which reliable temperature control of the furnace is sacrificed. If the amount of make-up fuel is close to the lower limit, then the amount of make-up fuel may not be adjusted to reduce the furnace fuel firing. Consequently, the residue gas controls the minimum amount of the fuel stream 140 that must be fired to dispose all of the residue gas, thereby limiting the suppression of steam generation.

The following thermal balance example shows the amount of steam made when all PSA residue gas is used, and the net fuel import is at its minimum:

| Hydrogen produced, Nm3/h | Total Furnace Firing Gcal/h | Fuel From PSA Residue Gas, Gcal/h | Make UP Fuel for Temp Control, Gcal/h | Make up fuel as % of Total Firing | Export Steam kg/h |
|---|---|---|---|---|---|
| 46000 | 103.14 | 90 | 13.14 | 12.7 | 52560 |

This thermal balance shows that the make up fuel is only 12.7% of total firing. To reduce the steam generation, the furnace firing needs to be reduced. However, because the make up fuel is close to the lower limit desired for furnace temperature control, the extent of furnace firing reduction is limited due to the fuel balance.

Furnace firing reduction may also be achieved by altering other operating parameters. One such parameter is the amount of steam added to the natural gas at the inlet to the reforming unit 130. Another such parameter is lowering of the reforming unit 130 outlet temperature. In both cases, these changes increase the methane slip at the reforming unit 130 outlet, which, in turn, will increase the amount and heat content of the PSA residue gas 165. However, as shown in the above example, the hydrogen generation process is already limited by the existing amount of residue gas 165, and therefore, cannot accommodate this increase in the residue gas.

There is a need, therefore, for a method to increase the flexibility and efficiency of the hydrogen generation process. There is also a need to reduce the amount of residue gas that must be disposed.

SUMMARY OF THE INVENTION

Embodiments of the present invention provide methods and apparatus for gas separation during hydrogen production. In one embodiment, the method includes producing hydrogen from a gas source and removing a hydrocarbon rich stream from the purification unit for recycling to the gas source.

Embodiments of the present invention provide methods and apparatus for producing hydrogen. In one embodiment, a method of producing hydrogen comprises reacting a feed source with steam to produce a gas mixture containing hydrogen and a residue gas; introducing the gas mixture into a purification unit; adsorbing the residue gas; and discharging at least a portion of the hydrogen. The method further comprises depressurizing the purification unit; discharging at least a portion of the residue gas during the depressurization; recycling the residue gas to the feed source; and discharging the residue gas remaining in the purification unit. In another embodiment, the method includes discharging a portion of the residue gas during the depressurization such that the residue gas discharged has a higher hydrocarbon content than the secondary product remaining in the purification unit.

Embodiments of the present invention provide methods and apparatus for handling product streams separated in a purification unit. In one embodiment, a pressure adsorption method for separating a gas mixture containing a primary product and a secondary product comprises introducing the gas mixture into a pressure adsorption unit; adsorbing the secondary product in the gas mixture; and discharging at least a portion of the primary product. The method further comprises depressurizing the pressure adsorption unit; discharging at least a portion of the secondary product during the depressurization; recycling at least part of the discharged portion of the secondary product to a hydrocarbon source of the gas mixture; and discharging the secondary product remaining in the pressure adsorption unit.

In another embodiment, a method of producing hydrogen comprises reacting a feed source with steam in a steam reforming unit, thereby producing a gas mixture containing hydrogen; introducing the gas mixture into a purification unit; discharging at least a portion of the hydrogen from the purification unit; depressurizing the purification unit; discharging a hydrocarbon rich stream from the purification unit; and directing the hydrocarbon rich stream to mix with the feed source.

In another embodiment, a method of operating a hydrogen production plant comprises introducing a feed source and steam to a hydrogen production unit; reacting a feed source with steam to produce a gas mixture containing hydrogen and a residue gas; introducing the gas mixture into a gas separation unit; and separating the hydrogen and the residue gas. The method further comprises directing a first portion of the residue gas to the feed source to reduce a quantity of the residue gas for use fuel and directing a second portion of residue gas remaining in the gas separation unit to a fuel source for use in a heat generator.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the present invention provide methods and apparatus for controlling production of hydrogen. In one embodiment, the method includes producing hydrogen from a gas source and removing a hydrocarbon rich stream from the purification unit for recycling to the gas source.

In another embodiment, a feed stream is processed to produce a mixture of primary product and secondary product. The mixture is introduced to a purification unit adapted to separate the primary product from the secondary product. In one embodiment, an intermediate product is generated from the mixture and recycled to the feed stream.

Figure 1:
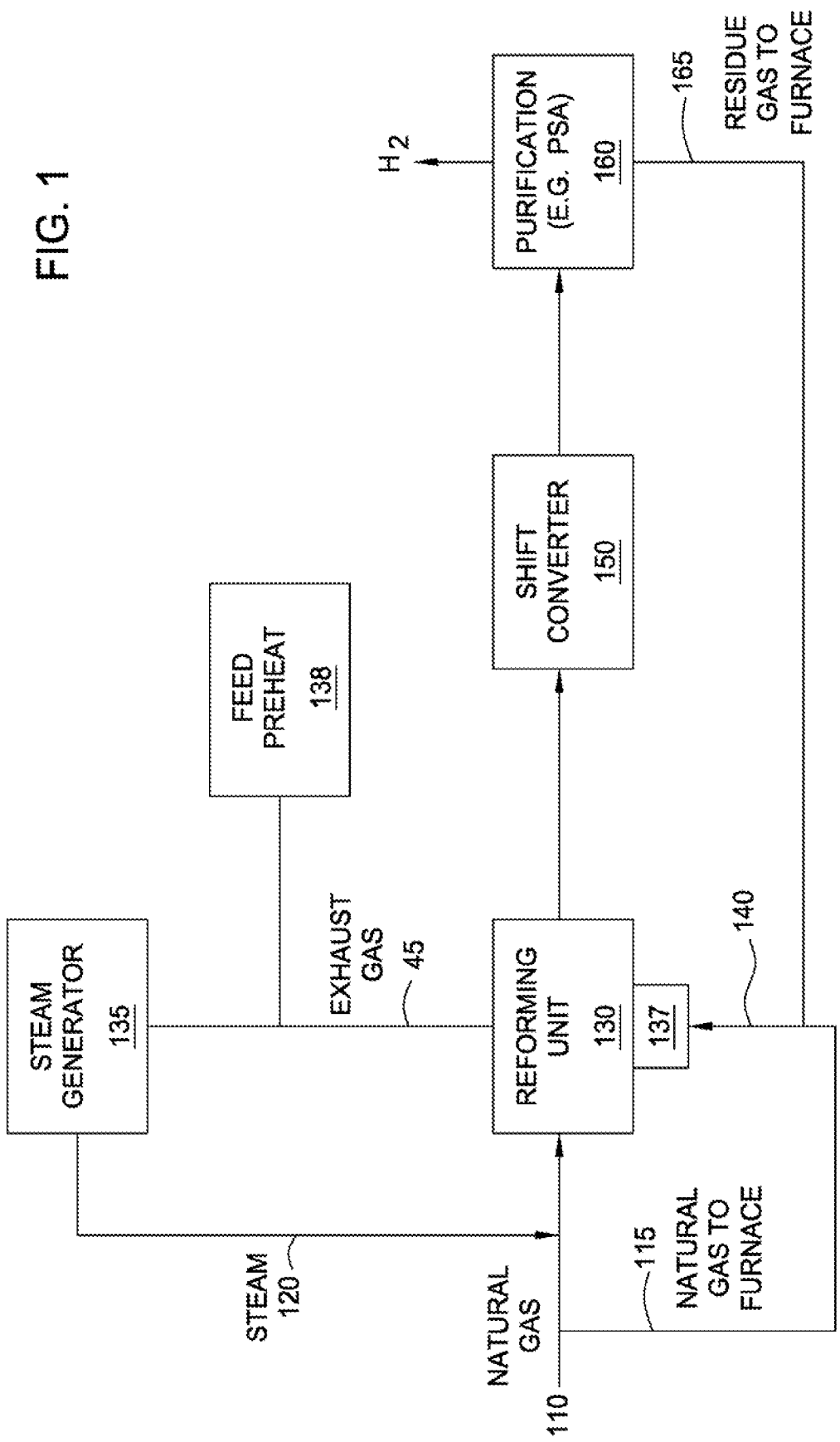
FIG. 1 illustrates a conventional plant for producing hydrogen from natural gas.
Figure 2:
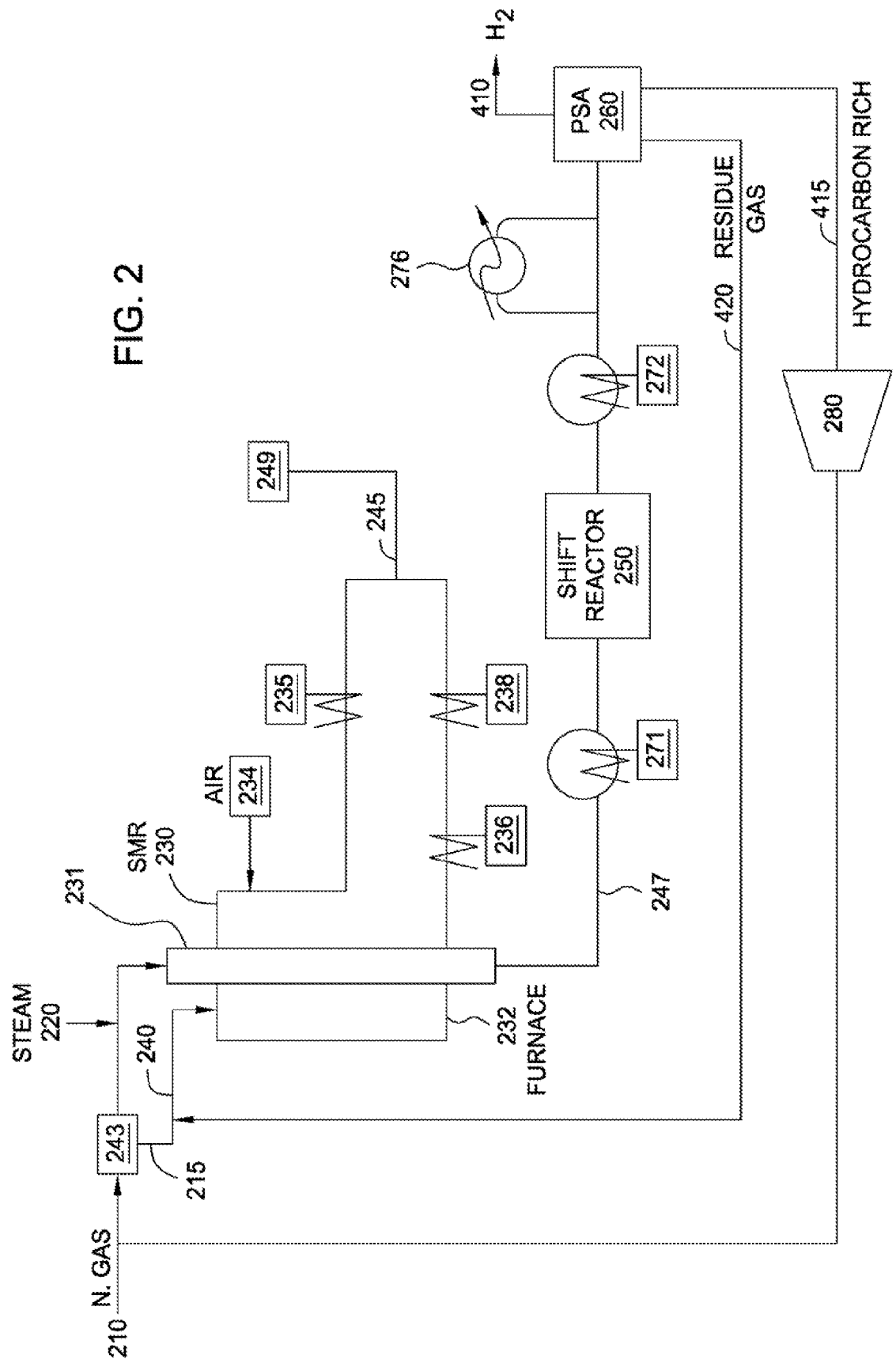
FIG. 2 illustrates a hydrogen production plant according to one embodiment of the present invention.
Figure 3:
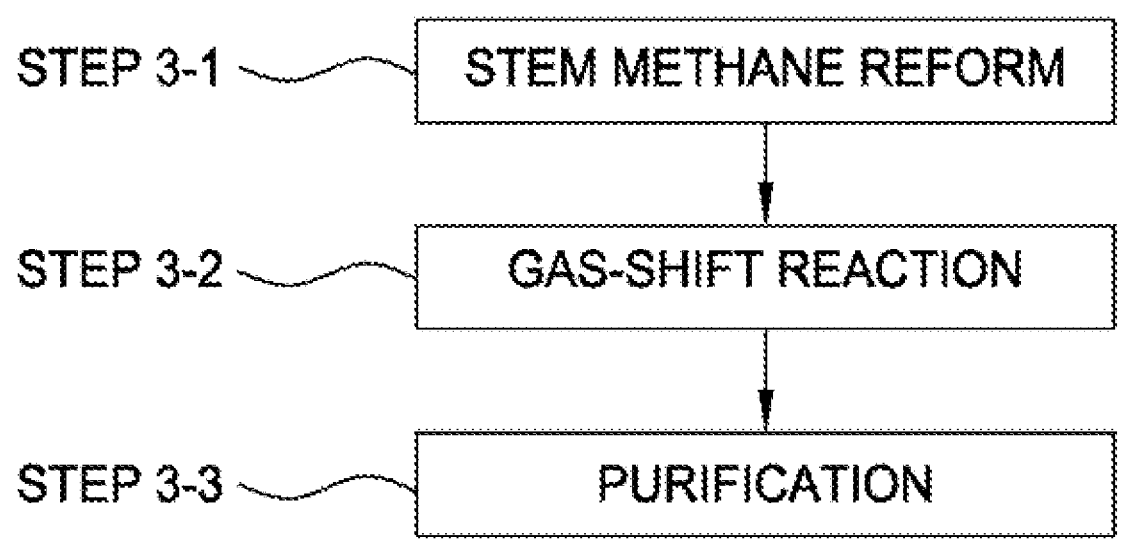
FIG. 3 illustrates a block flow diagram of hydrogen production process according to one embodiment of the present invention.

FIG. 2 is a block diagram depicting a hydrogen production process according to one embodiment of the present invention. The process generally involves three main steps, as shown in FIG. 3. Initially, at step 3-1, the methane is sent to the steam methane reformer unit 230 for at least partial conversion to hydrogen. As depicted in FIG. 2, natural gas stream 210 containing methane is combined with a steam stream 220 and delivered to a steam methane reforming ("SMR") unit 230. The steam and methane are passed through a metal alloy tube 231 containing a metal-based catalyst such as a nickel catalyst to facilitate the reaction between the methane and the steam. The steam and methane are heated and reacted in the presence of the catalyst to produce carbon monoxide and hydrogen. The steam reforming reaction proceeds as follow:

$$CH_4 + H_2O \Rightarrow CO + 3H_2$$

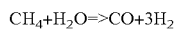

The reaction may take place at temperatures between about 600° C. and 1,000° C., preferably about 800° C. and 1,000° C.; and at pressures between about 10 atmospheres and 60 atmospheres, preferably about 20 atmospheres and 40 atmospheres. The reaction is highly endothermic and thus, requires heat input.

The heat for the reaction is provided by a furnace 232 used to heat the reforming unit 230. Fuel 240 for the furnace 232 may be supplied from the natural gas stream 215, the residue gas stream 420 from the PSA unit 260, other suitable source, and combinations thereof. In one embodiment, the residue gas stream 420 from the PSA unit 260 comprises less than 90% of the furnace fuel; preferably, less than 80%; more preferably, less than 70%. The furnace 232 requires an air stream which may be connected to a source of air 234. The exhaust gas 245 generated by the furnace 232 is typically at a high temperature range of 900° C. and 1,100° C. This energy may be efficiently utilized by directing the exhaust gas 245 to one or more steam generators 235 to superheat or generate the steam 220 for the reaction. In another embodiment, at least some of the hot exhaust gas 245 may be used by one or more preheaters 236, 238 to heat the natural gas stream 210, the air stream 234, the furnace fuel 240, and combinations thereof. The exhaust gas 245 may be vented through a stack 249. An optional feed preheater 243 may also be used to preheat the natural gas stream 210 before it enters the reforming unit 230 and/or the furnace 232. In the reforming unit 230, steam and methane react close to their chemical equilibrium. The unconverted methane (known as methane slip) is output by the SMR unit 230 in addition to carbon monoxide, carbon dioxide, and hydrogen. This effluent stream 247 exits the reforming unit 230 at 800° C. to 1000° C. The effluent stream's 247 temperature may be reduced before further processing. In one embodiment, an optional heater or steam generator 271 may be provided to recover some of the heat that is released. The recovered heat may be used to preheat feed, generate steam, preheat boiler feed water, or other suitable usage.

At step 3-2, the effluent stream 247 from the reforming unit 230 is sent to a gas-shift reactor unit 250 to obtain additional hydrogen. In the gas-shift reactor unit 250, the carbon monoxide is reacted with steam to produce more hydrogen. The chemical equation for the shift reaction is as follows:

$$CO + H_2O \Rightarrow CO_2 + H_2$$

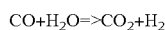

The steam reacts with the carbon monoxide, thereby forming additional hydrogen and carbon dioxide. The reaction energy is exothermic. The reaction produces a mixture of carbon dioxide, hydrogen, and unreacted carbon monoxide. The shift reactor effluent is cooled before it enters the purification unit 260. The heat may be recovered with an optional heater or steam generator 272 to preheat feed, generate steam, preheat boiler feed water, or other suitable usage. An optional cooler 276 may be provided if additional cooling of the effluent stream is required.

Figure 4:
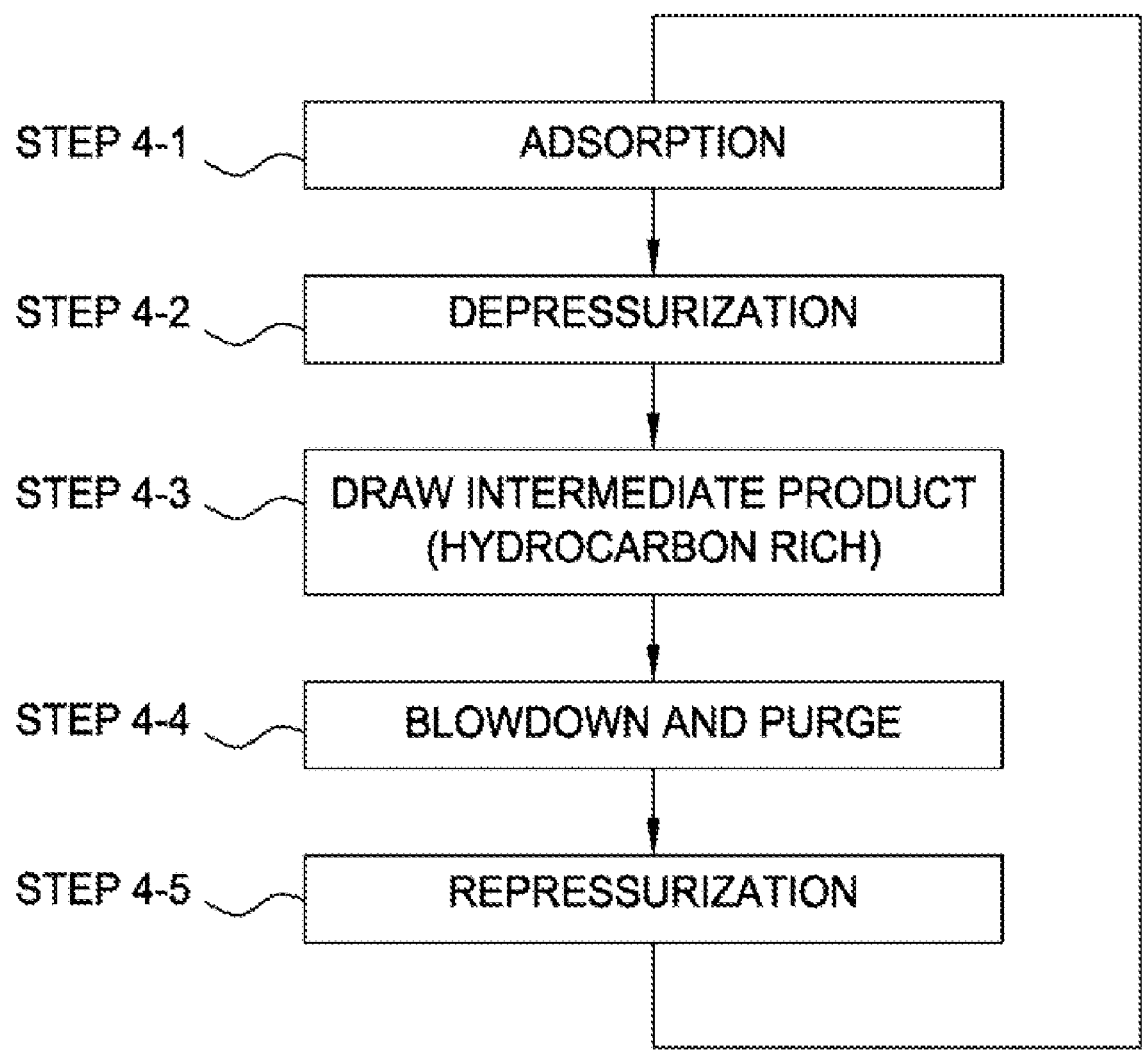
FIG. 4 illustrates a block flow diagram of an embodiment of a hydrogen purification process suitable for use with the hydrogen production process of FIG. 3.
Figure 5:
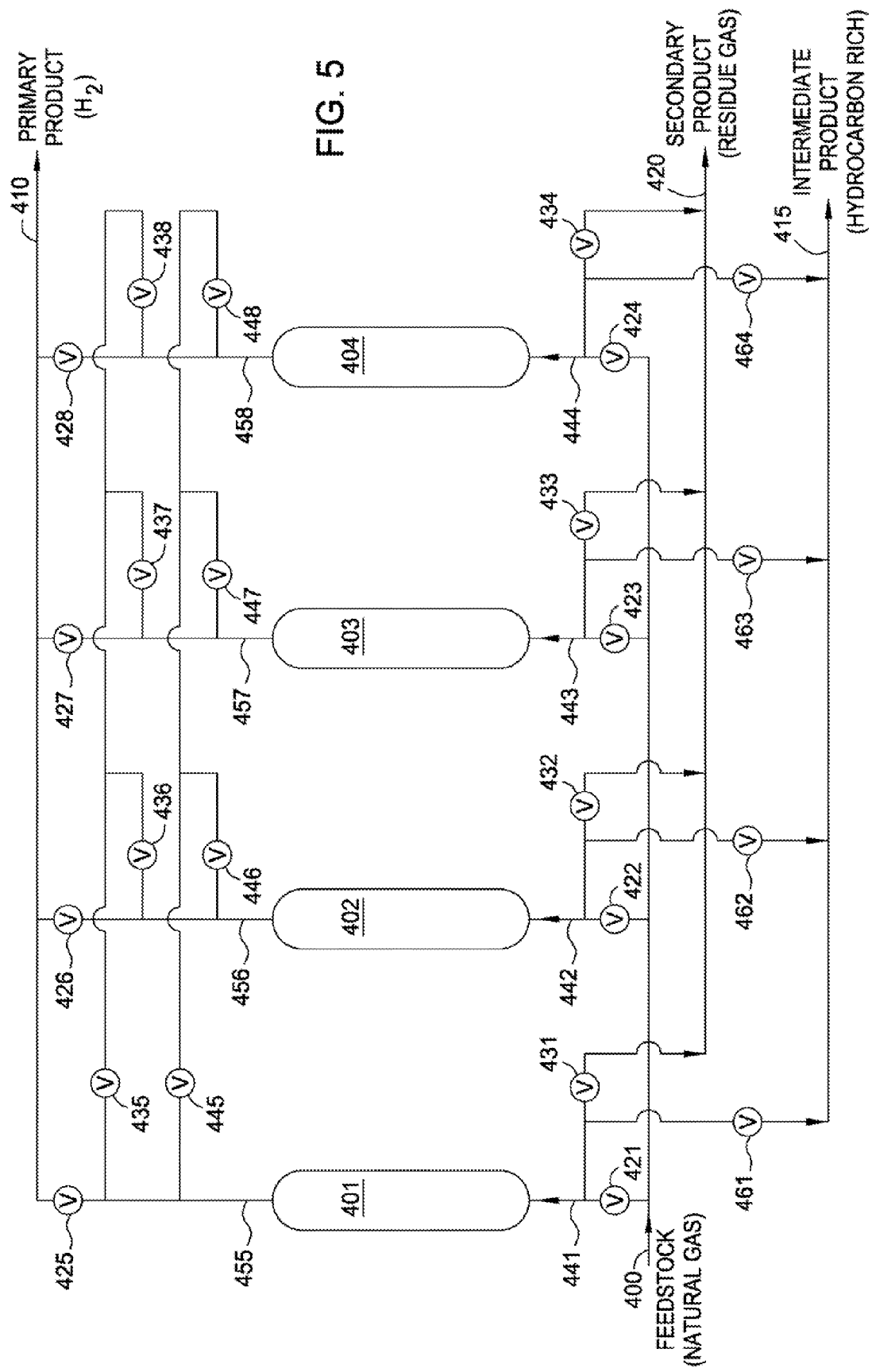
FIG. 5 shows a schematic diagram of a PSA unit according to one embodiment of the present invention.

At step 3-3, the effluent stream 257 from the gas-shift reactor unit 250 is sent to a purification unit 260 to separate the hydrogen gas from the other gases in the stream 257. In one embodiment, pressure swing adsorbers ("PSA") are used to separate out the hydrogen gas product. FIG. 4 illustrates a PSA process 400 for separating hydrogen according to one embodiment of the invention. FIG. 5 shows an exemplary PSA unit 260 suitable to perform the PSA process. In one embodiment, the PSA process is adapted to continuously separate the effluent stream and continuously remove from the PSA unit 260 a primary gas product stream, a secondary gas product, and an intermediate gas product stream through lines 410, 420, and 415, respectively. As shown, the PSA unit 260 includes four reaction chambers, 401, 402, 403, and 404, each of which contains one or more adsorbent beds which are preferentially selective for the secondary gas product and the intermediate gas product over the primary gas product. In the preferred embodiment, the primary gas product stream 410 comprises hydrogen, the second gas product stream 420 comprises a residue gas, and the intermediate gas product stream 415 comprises a hydrocarbon rich residue gas.

As shown in FIG. 4, the PSA purification process includes steps which may be repeated in a successive cycle period. Each reaction chamber 401, 402, 403, 404 is capable of performing all of the steps of the purification process cycle. In one embodiment, the continuous PSA process operates the reaction chambers such that each step in the cycle is being performed by at least one reaction chamber at anyone point in time. For example, the reaction chambers may be operated to perform the process cycle out-of-phase such that adjacent reaction chambers are performing a different step of the cycle. In another embodiment, one or more reaction chambers may be operated to perform the process cycle in-phase such that one or more reaction chambers are performing the same step in the cycle at anyone time. Although four reaction chambers are shown, it is contemplated that any suitable number of reaction chambers may be used, for example, three, four, five, ten, or more chambers. Additionally, the reaction chambers may be arranged in series, parallel, or combinations thereof.

In one embodiment, a process cycle 400 may begin with performing the adsorption step (step 4-1) in the first reaction chamber 401. Initially, the effluent stream 257 from the gas-shift reactor unit 250 is supplied through the supply line 400 at a predetermined high pressure. Valve 421 is opened to allow the effluent stream 257 to flow into the first chamber 401 where adsorption of the impurities may take place. During this time, valves 422, 423 and 424 are closed to prevent the effluent stream 257 from flowing into chambers 402, 403 and 404, and valves 431 and 461 are closed to prevent the effluent stream from flowing through the second product stream 420 and the intermediate product stream 415. In the chamber 401, the adsorbent beds preferentially adsorb the impurities such as carbon monoxide, carbon dioxide, and methane from the effluent stream 257. The hydrogen in the effluent stream is allowed to flow out of the chamber 401 into line 455, through the open valve 425, and into the primary product stream 410. Valves 426, 427 and 428 along with valves 435, 445 are closed during this period. It is contemplated that any suitable adsorbents may be used. Exemplary adsorbents include activated carbon, activated alumina, silica gel, zeolites, and other known adsorbents so long as the adsorbent has the desired affinity for one portion of a gas mixture over another portion.

While the first reaction chamber 401 is undergoing the adsorption step, the second reaction chamber performs the depressurization step (step 4-2). In this respect, the second chamber 402 has already performed the preceding adsorption step. During the depressurization step, the pressure in the chamber 402 (from the adsorption step) is released through either valve 432 or valve 462 or both, whereby most of the adsorbed impurities are discharged into either line 420, line 415, or both. Valves 426, 436, 446 and 422 are closed to permit the discharge from the chamber 402 and ensure the discharge is not directed toward other chambers.

In one embodiment, an intermediate product stream 415 is drawn (step 4-3) from the chamber 402 during the depressurization step (step 4-2). The intermediate product stream 415 may contain adsorbed impurities from the effluent stream 257 such as methane, carbon monoxide, and nitrogen from the natural gas as well as some hydrogen. The intermediate product stream 415 collected at this point of the cycle may contain a higher percentage of hydrocarbons (such as methane) than the secondary product stream 420, and thus, may be referred to as a hydrocarbon rich stream. During depressurization, valve 462 is opened to allow the contents in the chamber 402 to discharge into the intermediate product stream 415. Because the intermediate product stream 415 is hydrocarbon rich, it may be directed to combine with the natural gas feedstock 210 for recycling. A compressor 280 may be provided to increase the pressure of the intermediate product stream 415 to facilitate mixing with the natural gas feedstock 210. After the desired amount of intermediate product has been collected, valve 462 is closed and valve 432 is opened, thereby discharging the remaining impurities into the secondary product stream 420. In this manner, the amount of residue gas (i.e., secondary product stream 420) available for use as fuel may be significantly reduced. In one embodiment, the intermediate product is drawn while the chamber 402 depressurizes from 20 atmospheres to 1 atmosphere, preferably, from 8 atmospheres to 3 atmospheres. The withdrawn intermediate product may contain methane and carbon monoxide in the range from 10% to 50%, preferably, from 20% to 40%.

It is contemplated that the intermediate product stream 415 may be drawn from the chamber 402 during a portion of the depressurization step or the entire depressurization step. If only a portion of the discharge from the depressurization is collected as the intermediate product stream 415, then it is preferred that the intermediate product stream 415 is drawn at the highest pressure having the desired enrichment of methane and carbon monoxide. In one embodiment, the chamber 402 is initially depressurized by opening valve 446 and valve 448 such that gas in the second reaction chamber 402 may be used to repressurize another chamber, e.g., the fourth reaction chamber 404. This depressurization-repressurization step is sometimes referred to as an equalization step. At the beginning of depressurization, the gas discharged from the second reaction chamber 402 has a higher content of hydrogen. As the pressure in the second reaction chamber 402 decreases, the hydrogen content decreases while the hydrocarbon content increases. When the desired hydrocarbon content is reached, gas flow to repressurize the fourth reaction chamber 404 may be stopped. Valve 462 may then be opened to allow the hydrocarbon rich gas to discharge into the intermediate product stream 415, which may recycle the gas to the natural gas feedstock 210.

Figure 5A:
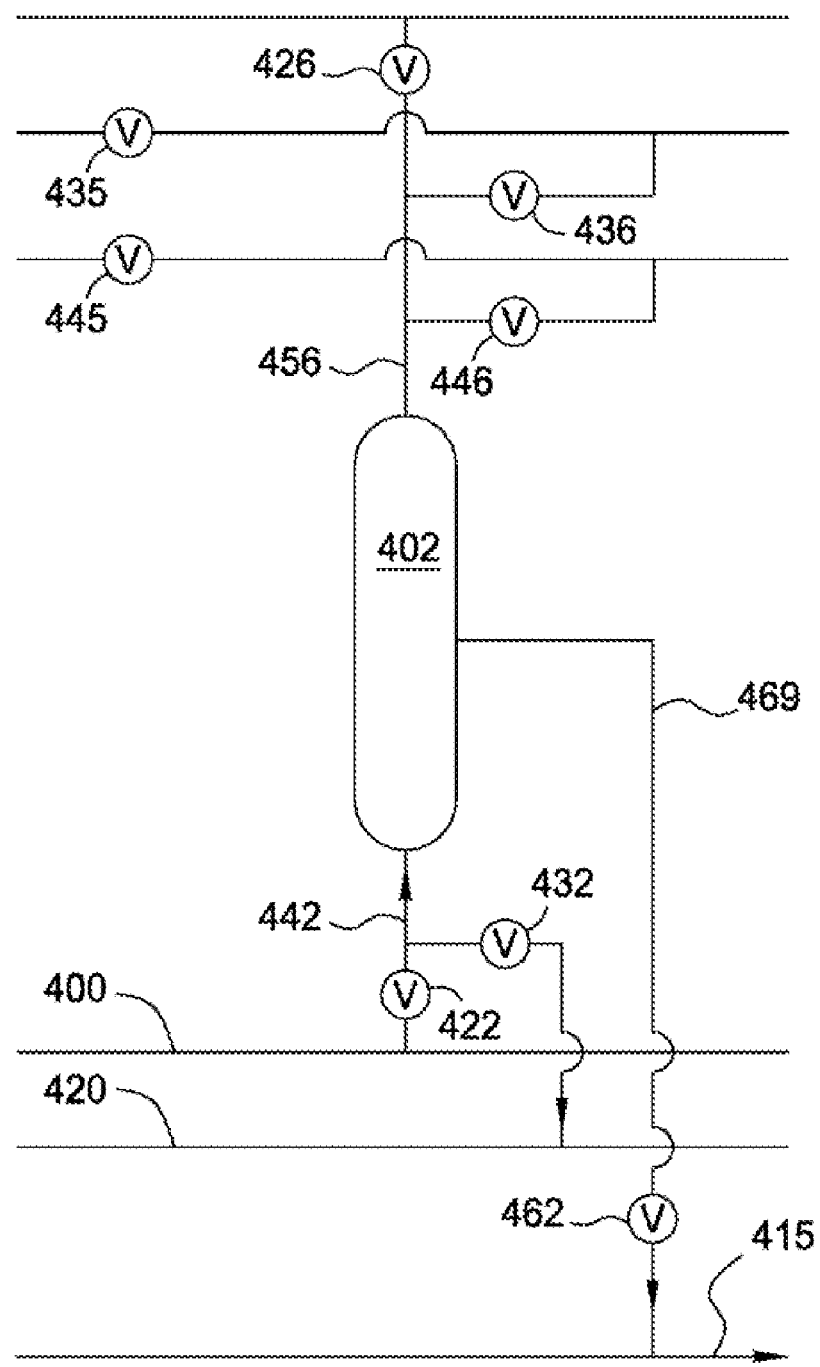
FIG. 5A shows a schematic diagram of a partial PSA unit according to another embodiment of the present invention.

FIG. 5A shows a partial view of another embodiment of a PSA unit 260. In this embodiment, the intermediate stream 415 may be drawn from a middle portion (via line 469) of the reaction chamber 402 to collect a higher percentage of hydrocarbons. Generally, as the effluent stream 257 flows up the reaction chamber 402, the strongly adsorbed impurities, such as carbon dioxide, are adsorbed at the bottom while the lighter impurities are adsorbed at the top. The typical order of strongly adsorbed impurity to lightly adsorbed impurity is as follows: carbon dioxide, methane, carbon monoxide, nitrogen, and hydrogen. Thus, carbon dioxide may be found in the lower portion of the reaction chamber 402, methane may be found in the middle portion of the reaction chamber 402, and carbon monoxide may be found in the upper portion of reaction chamber 402. Therefore, an intermediate stream 415 drawn from the middle portion of the reaction chamber 402 will be more likely to produce a richer hydrocarbon stream. The hydrocarbon rich stream may be combined with the natural gas feedstock 210 for re-introduction into the system. It must be noted that the intermediate product stream 415 may also be directed to a product stream that is not recycled to the system; used as fuel, if necessary; or otherwise disposed as appropriate.

In another embodiment, depressurization of the second reaction chamber 402 may occur at both ends of the chamber 402, while drawing hydrocarbon rich gas from the middle portion of the chamber 402. In FIG. 5A, stream 469 is drawn while depressurizing the second reaction chamber 402 through streams 456 and 442. In this respect, gas exiting the lower end of the chamber 402 via valve 432 may contain a higher concentration of carbon dioxide; gas leaving the upper end via line 456 may contain a higher concentration of hydrogen and carbon monoxide; and gas leaving the middle portion via line 469 may contain a higher concentration of methane. Thus, gas discharged from the middle portion of the chamber 402 may be directed to the hydrocarbon rich stream 415 using appropriate valves and connections (not shown); gas discharged from the lower end of the chamber 402 may be directed to the residue gas stream 420; and the gas discharged from upper end may be used for repressurizing another chamber. One benefit of simultaneously discharging the chamber 402 from top end, bottom end, and middle portion is that the gas flowing out of the lower end carries with it a higher concentration of carbon dioxide, thereby preventing or reducing the quantity of carbon dioxide that is discharged at the upper end and middle portion. As a result, the gas discharged at the middle portion has a richer hydrocarbon content.

Referring back to FIGS. 4 and 5, a blowdown and purge step (step 4-4) may be performed by the third reaction chamber 403 while the first chamber 401 and the second chamber 402 are undergoing their respective steps, i.e., step 4-1 and step 4-2. In this respect, the third chamber 403 has already performed the preceding steps 4-1 to 4-3 in the process cycle 400. Valve 463 is opened to blowdown the chamber 403 to a lower pressure of the secondary product. To purge the third chamber 403, valves 435 and 437 are opened to allow a portion of the primary gas product from the first chamber 401 to flow into the third chamber 403. During this time, valves 436, 438, 427, 447, 423, and 463 are closed to enable flow of primary gas product from the first chamber 401 to the third chamber 403. The primary product flows through the third chamber 403 and carries with it substantially all of the impurities remaining in the third chamber 403 after the depressurization and blowdown steps. This stream leaves the third chamber 403 through valve 433 and enters the secondary product stream 420. The secondary product stream 420 may have a pressure between 20 atmospheres to 0.1 atmospheres, preferably, from 8 atmospheres to 1 atmosphere. It is preferred to use as low a pressure as possible to promote the maximum desorption of impurities from the chamber 403. One or more pressure reduction valves (not shown) may be used to reduce the pressure of the purge gas, e.g., the primary gas product from the first chamber 401. In one embodiment, the secondary product stream 420 leaving the PSA unit 260 comprises the residue gas stream which is recycled to the fuel line 240 to be used as fuel to heat the furnace 232, see FIG. 2.

The repressurization step (step 4-5) of the process cycle 400 may be performed by the fourth reaction chamber 404 while the first chamber 401, the second chamber 402, and the third chamber 403 are undergoing their respective steps, i.e., step 4-1 and step 4-4. In this respect, the fourth chamber 404 has already performed the preceding steps 4-1 to 4-4 in the process cycle 400. To repressurize the fourth chamber 404, valves 445 and 448 are opened to allow another portion of the primary gas product from the first chamber 401 to flow into the fourth chamber 404. During this time, valves 446 and 447 are closed to ensure flow of the primary product from the first chamber 401 to the fourth chamber 404 and to prevent contamination of the second and third chambers 402, 403. Also, valves 428, 438, 424, 434, and 464 are closed to retain the primary product in the fourth chamber 404. The primary product flowing into the fourth chamber 404 repressurizes the chamber 404 from the lower pressure resulting from the depressurization step 4-2 and the purge step 4-4 to the higher pressure of the primary product. It is contemplated that at least part of the repressurization may be accomplished by gas discharged from a chamber (e.g., the second reaction chamber 402) undergoing depressurization, as described above. After repressurization, the fourth chamber 404 is ready to begin a new process cycle.

Successive steps may be conducted in the above described manner with the specific steps being shifted from chamber to chamber as the cycle progresses. For example, as the fourth chamber 404 begins a new process cycle by performing the adsorption step 4-1, the first chamber 401 may begin the next step in its process cycle, which is the depressurization step 4-2. Similarly, the second chamber 402 may begin the purge step 4-4 after undergoing the depressurization step 4-2 and discharging an intermediate product stream (step 4-3), and the third chamber 403 may begin the repressurization step 4-5 after undergoing the purge step 4-4. The primary gas product used to purge and repressure chambers 402 and 403 is now supplied from the fourth chamber 404. The portion of the primary product discharged from the fourth chamber 404 which is not used for purge or repressurization is removed from the PSA unit 260 as the primary product stream 410. In this manner, a continuous process for separating the effluent stream 257 into a primary gas stream 410 (e.g., hydrogen), an intermediate gas stream 415 (e.g., hydrocarbon rich stream), and a second gas stream 420 (e.g., residue gas) may be achieved.

EXAMPLE

Figures 6, 7:
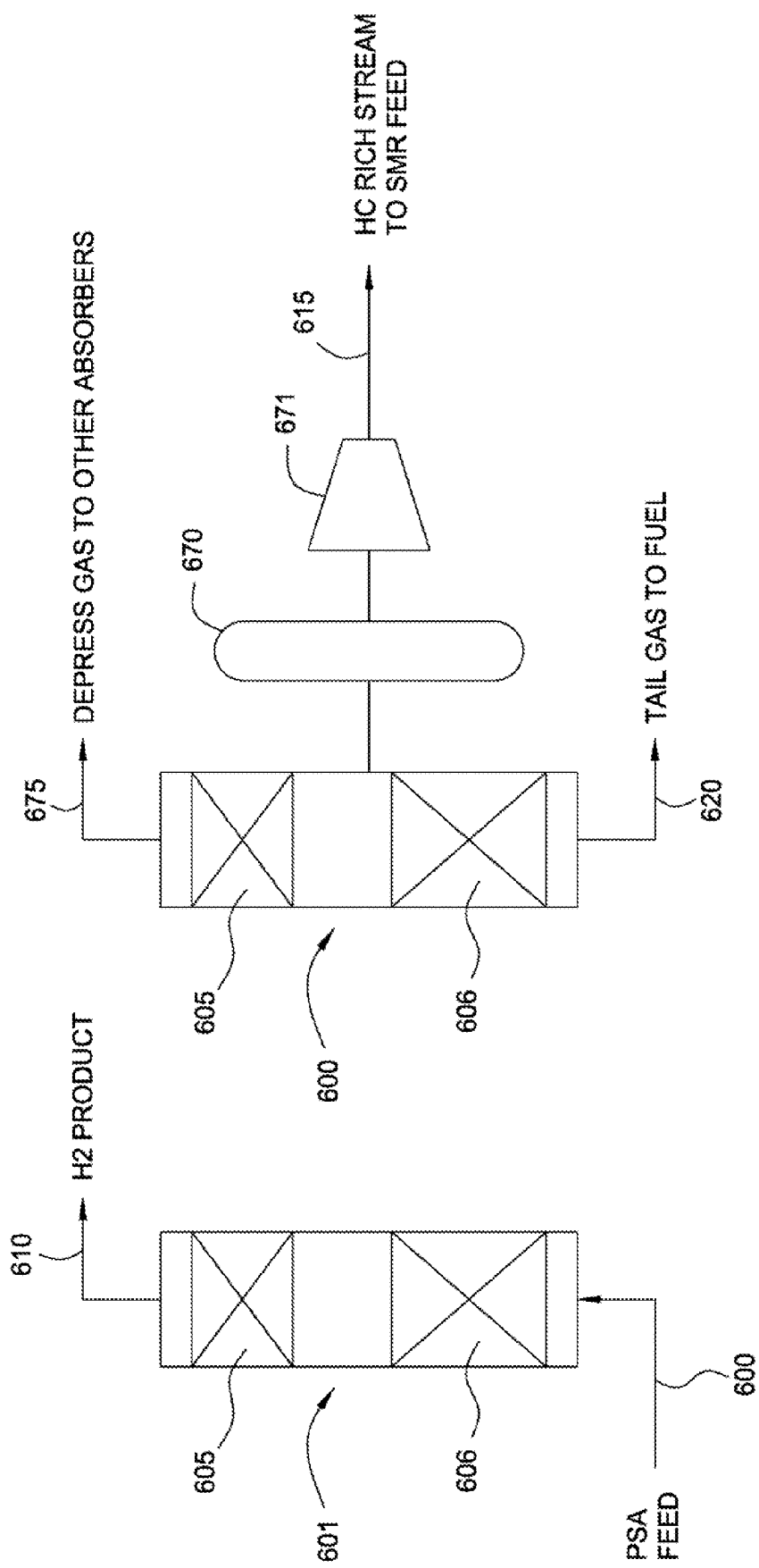
FIG. 6 shows a schematic diagram of a partial PSA unit according to another embodiment of the present invention
FIG. 7 shows a schematic diagram of the partial PSA unit in FIG. 6 performing a different step of the purification process.

The following example of continuous production of hydrogen serves to explain and illustrate an embodiment of the present invention. FIGS. 6 and 7 show an exemplary reaction chamber 601 during the adsorption step (FIG. 6) and the depressurization step (FIG. 7). As shown in FIG. 6, the beds 605, 606 of the reaction chamber 601 are divided into two parts, enabling a draw of stream between the two divided beds 605, 606. During the adsorption step, the effluent feed 600 enters the bottom of the reaction chamber 601 and pure hydrogen exits the top 610 of the reaction chamber 601. In FIG. 7, the PSA process cycle includes a step (step 4-3) to draw an intermediate stream 615 during the depressurization of the reaction chamber 601 from about 8 to 3 barg. As the reaction chamber 601 is depressurized, the concentration of impurities in the void space of the reaction chamber 601 increases. The concentration of methane and the carbon monoxide at this point are in the range of 20 to 40%. The methane and carbon monoxide rich stream 615 is collected in a surge drum 670, compressed by compressor 671 to about 35 barg and recycled back to reformer 230. The recycled hydrogen and carbon monoxide will establish a new equilibrium in the reformer 230. In this manner, the amount of fuel 620 that has to be burned in the SMR furnace 230 is reduced. One resulting benefit is that this may allow the reduction of furnace firing to be accomplished using other operating parameters, such as reducing steam flow to the process, lowering reformer outlet temperature, and recovering and recycling more heat into the process. In this respect, the amount of export steam is reduced and the thermal efficiency of the process may be improved. Any residue gas drawn during depressurization step and not recycled is directed to the residue gas line 620 and recycled for use as fuel or directed to other reaction chambers.

The new material balance and thermal balance for this example is shown below.

Material Balance:

| Component | Unit | Feed to PSA | Pure H2 | Residue Gas | Hydrocarbon Rich Stream |
|---|---|---|---|---|---|
| H2 | Nm3/h | 78449 | 69820 | 6229 | 2400 |
| CH4 | Nm3/h | 6339 | | 3939 | 2400 |
| CO | Nm3/h | 4470 | | 2070 | 2400 |
| CO2 | Nm3/h | 17246 | | 17246 | 0 |
| N2 | Nm3/h | 450 | 70 | 180 | 200 |
| Flow | Nm3/h | 106954 | 69890 | 29664 | 7400 |
| Heating Value | Kcal/Nm3, LHV | | | | |
| Pressure | Bar a (psig) | 25.3 (350) | 24.3 (335) | 1.3 (5) | 8-3 (116-45) |

Thermal Balance:

| Hydrogen produced, Nm3/h | Total Furnace Firing Gcal/h | Fuel From PSA Residue Gas, Gcal/h | Make UP Fuel for Temp Control, Gcal/h | Make up fuel as % of Total Firing | Export Steam kg/h |
|---|---|---|---|---|---|
| 46000 | 88.9 | 56.0 | 32.9 | 37 | 30000 |

In comparison to the example shown in the Background, this example shows that the PSA residue gas available for use as fuel is reduced from 90 to 56 Gcal/h. Even though the total fuel required to heat the SMR furnace 230 is reduced from 103.14 to 88.9 Gcal/h, the make up fuel quantity still increased from 13.14 to 32.9 Gcal/h, an increase from 12.7% to 37% of the total fuel. This increase allows more of the make up fuel to be managed, there by making the overall process more flexible. As a result, more options are available to optimize the process with out being without being limited by the fuel balance. In must be noted that although the concentration of carbon dioxide in the above example is zero, the concentration of carbon dioxide and other gases may be adjusted depending upon the parameters of the PSA. Exemplary parameters that may influence the concentration of carbon dioxide or other gases include the selection of the adsorbent bed and the manner in which the bed is depressurized.

According to embodiments of the present invention, several benefits may be provided by reducing the total heat content of the residue gas that is disposed as fuel. In one embodiment, one benefit that may be achieved is that less steam is produced as a byproduct of hydrogen production. As shown in the example above, export steam is reduced from 52,560 kg/h to 30,000 kg/h. It can also be seen that to produce the same quantity of hydrogen, less fuel is now burned in the furnace, e.g., total furnace firing is reduce from 103.14 Gcal/h to 88.9 Gcal/h. These results are due to the flexibility in the process created by the reduction in the residue gas disposed as fuel. Other process parameters such as changing the amount of the steam fed to the process, reducing the reformer outlet temperature, or increasing the temperature of feed or combustion air entering the reformer, may now be adjusted to optimize the process. Another benefit that may be achieved is that the hydrogen production process becomes more thermally efficient. The reduction of fuel firing for the same quantity of hydrogen production reduces the thermal losses associated with loss of heat with the flue gas. As a result, the plant thermal efficiency is improved by 0.5%. Another benefit that may be achieved is the process enables the processing of an import stream, such as a refinery off gas, into the PSA unit of the reforming unit and still be not limited by the amount of residue gas that must be used as fuel in the reforming unit.

Another benefit is that that the operating conditions of the SMR unit may be modified to reduce the process severity without adversely affecting the fuel balance. In a conventional operation, the amount of unconverted carbon (also known as "methane slip") from the reaction is controlled by adjusting the furnace temperature or steam input rate. In instances where steam input is low, (e.g., where the steam/carbon ratio is less than 2.5), the reformer outlet temperature is increased to 900-930° C. (1650-1706° F.) to limit the amount of unconverted carbon. This increased severity on the reformer adversely affects the reliability and cost of the plant. In comparison, a process in accordance with embodiments of the present invention is capable of operating at a lower steam/carbon ratio while reducing the reformer outlet temperature and allowing a higher methane slip. In one example, the reformer severity may be reduced to 850° C. (1560° F.). This is because the present process is capable of recycling the unconverted hydrocarbon back to the feed so that it does not end up in the fuel. Thus, the hydrogen may be produced at a lower outlet temperature and low steam/carbon ratio even though those conditions would generally produce a higher quantity of unconverted hydrocarbon.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A pressure adsorption method for separating a gas mixture containing a primary product and a secondary product, comprising:
   introducing the gas mixture into a pressure adsorption unit;
   adsorbing the secondary product in the gas mixture;
   discharging at least a portion of the primary product from the pressure adsorption unit;
   depressurizing the pressure adsorption unit;
   discharging at least a portion of the secondary product from the pressure adsorption unit during the depressurization;
   recycling at least a part of the discharged portion of the secondary product to a hydrocarbon source of the gas mixture; and
   discharging the secondary product remaining in the pressure adsorption unit.

2. The method of claim 1, further comprising processing the hydrocarbon source to generate the primary product and the secondary product.

3. The method of claim 2, wherein processing the hydrocarbon source comprises introducing the hydrocarbon source into a steam reforming unit.

4. The method of claim 3, wherein processing the hydrocarbon source further comprises introducing the hydrocarbon source into a gas-shift reactor.

5. The method of claim 1, further comprising repressurizing the pressure adsorption unit.

6. The method of claim 1, wherein discharging the second product at least partially occurs during the depressurization.

7. The method of claim 1, further comprising purging the pressure adsorption unit.

8. The method of claim 7, wherein discharging a portion of the secondary product occurs during the purging.

9. The method of claim 1, wherein a composition of the portion of the secondary product discharged during the depressurization step is different from a composition of the secondary product remaining in the pressure adsorption unit.

10. The method of claim 1, wherein the secondary product is discharged from an upper portion of the pressure adsorption unit.

11. The method of claim 1, wherein the primary product comprises hydrogen.

12. The method of claim 11, wherein the secondary product comprises a residue gas.

13. The method of claim 12, wherein the residue gas comprises at least one of carbon monoxide, carbon dioxide, and methane.

14. The method of claim 11, wherein the portion of the secondary product discharged during the depressurization step has a higher hydrocarbon content than the secondary product remaining in the pressure adsorption unit.

15. The method of claim 1, wherein the pressure adsorption unit comprises one or more reaction chambers containing one or more adsorbents.

16. The method of clam 15, further comprising operating two or more reaction chambers out of phase.

17. The method of claim 16, further comprising using a primary product from one reaction chamber to purge another reaction chamber.

18. A method of operating a hydrogen production plant, comprising:
   introducing a feed source and steam to a hydrogen production unit;
   reacting a feed source with steam to produce a gas mixture containing hydrogen and a residue gas;
   introducing the gas mixture into a gas separation unit;
   separating the hydrogen and the residue gas;
   directing a first portion of the residue gas in the separation unit to the feed source to reduce a quantity of the residue gas for use as fuel; and
   directing a second portion of residue gas remaining in the gas separation unit to a fuel source for use in a heat generator.

19. The method of claim 18, wherein first portion has a higher hydrocarbon content than a second portion.

20. The method of claim 18, further comprising depressurizing the gas separation unit.

21. The method of claim 20, further comprising discharging the first portion of the residue gas during the depressurization.

22. The method of claim 21, wherein the first portion of the residue gas is discharged from an upper portion of the gas separation unit.

23. The method of claim 20, further comprising purging the gas separation unit.

24. The method of claim 23, further comprising repressurizing the gas separation unit.

25. The method of claim 18, wherein the first portion and the second portion of the residue gas are simultaneously discharged from the gas separation unit.

26. The method of claim 25, further comprising discharging at least a portion of the hydrogen while discharging the first portion and the second portion of the residue gas.

* * * * *